US012121762B1

(12) United States Patent
Janecka et al.

(10) Patent No.: US 12,121,762 B1
(45) Date of Patent: Oct. 22, 2024

(54) AUTOMATIC VEHICLE FIRE BLANKET DEPLOYMENT SYSTEM

(71) Applicants: Charles Frederick Janecka, Houston, TX (US); Nathanael Steven Banda, Elgin, TX (US)

(72) Inventors: Charles Frederick Janecka, Houston, TX (US); Nathanael Steven Banda, Elgin, TX (US)

( * ) Notice: Subject to any disclaimer, the term of this patent is extended or adjusted under 35 U.S.C. 154(b) by 0 days.

(21) Appl. No.: 18/762,346

(22) Filed: Jul. 2, 2024

(51) Int. Cl.
*A62C 3/07* (2006.01)
*A62C 8/06* (2006.01)
*A62C 37/36* (2006.01)

(52) U.S. Cl.
CPC .................. *A62C 3/07* (2013.01); *A62C 8/06* (2013.01); *A62C 37/04* (2013.01)

(58) Field of Classification Search
CPC .............. A62C 3/07; A62C 8/06; A62C 37/04
See application file for complete search history.

(56) References Cited

U.S. PATENT DOCUMENTS

2002/0105207 A1 8/2002 McGrath
2004/0158924 A1 8/2004 Frandsen-Anderson
2023/0330458 A1 10/2023 Halawani

FOREIGN PATENT DOCUMENTS

TW M647596 U * 10/2023
WO WO 2023/232486 A1 * 12/2023

OTHER PUBLICATIONS

English translation of TW M647596 U (Year: 2023).*
English translation of WO 2023/232486 A1 (Year: 2023).*

* cited by examiner

*Primary Examiner* — Qingzhang Zhou
*Assistant Examiner* — Joel Zhou
(74) *Attorney, Agent, or Firm* — Walter J. Tencza, Jr.

(57) ABSTRACT

A device which automatically drops a fire blanket onto a vehicle. The device may be situated above a parking space. The device may automatically drop the fire blanket in response to a signal from a smoke sensor or fire sensor. The device may include an enclosure; a spindle; and a fire blanket; wherein the fire blanket is configured to be stored in the enclosure by being wrapped around the spindle; and wherein the first device is configured to automatically drop the fire blanket by using first and second wires located on opposite corners of a side of the fire blanket. The first and second wires may be connected to a grabber that is connected to the fire blanket so when the fire blanket is completely unfurled, the grabber passes through a constraining hole which opens an end of the grabber holding the fire blanket which then releases the fire blanket.

13 Claims, 5 Drawing Sheets

AUTOMATIC VEHICLE FIRE BLANKET DEPLOYMENT SYSTEM

FIELD OF THE INVENTION

This invention relates to improved methods and apparatus concerning electric vehicle fire prevention.

BACKGROUND OF THE INVENTION

Vehicles have always been a potential fire hazard. This fire hazard has been complicated with the rise in popularity of electric vehicles. While the hazards of vehicle fires and mitigation effects of fire blankets on them are known, an automatic system of deploying these fire blankets is not currently available. Fire blankets for vehicles exist, but are largely owned and used by local fire departments. The two biggest concerns with this are the time it takes the fire department to respond and whether the vehicle is in a garage. If it is, the fire department must remove the vehicle from the garage, while it is on fire, in order to cover it with the fire blanket. This simply adds more time for the fire to spread beyond the vehicle.

US published patent application no. 2023/0330458 describes a folded fire blanket that is automatically unfolded and deployed downward. It is designed for industrial use. As such, it requires large vertical beams for outdoor placement and is too large for consumer use.

US published patent application no. 2004/0158924 describes a fire blanket stored within a vehicle. However, it is to be used for fire mitigation where the item on fire is inside the vehicle and not the vehicle itself.

US published patent application no. 2002/0105207 describes a self-deploying cover for a vehicle, but this cover is for general protection of the vehicle from the environment. It is not for mitigating a fire issue when the vehicle is on fire.

SUMMARY OF THE INVENTION

One or more embodiments of the present invention provide a novel vehicle fire mitigation system using a fire blanket.

A first and principal object of one or more embodiments of the present invention is to provide a system by which a fire blanket is automatically deployed to cover a vehicle in response to a signal from a smoke and/or fire sensor.

The following operation of the embodiments describes an improvement to the containment of a vehicle that is on fire.

Still other embodiments and advantages of the present invention will become readily apparent to those skilled in this art from the following detailed description, which shows and describes differentiating embodiments, simply by way of illustration of the best mode now contemplated of carrying out the invention. As will be realized, the invention is capable of modification in various obvious respects without departing from the invention. Accordingly, the drawings and description of the preferred embodiment are to be regarded as illustrative in nature, and not as restrictive.

In at least one embodiment, an apparatus is provided comprising a fire blanket wrapped around a spindle, both of which are contained in an enclosure. This enclosure is positioned above one end of a vehicle parking space. The fire blanket is, by way of two mechanical tongs, connected to two cables which stretch above and across the vehicle parking space to the other end of the space. The cables, at this end, are attached to another spindle which is attached to a motor. This motor is connected to sensors and a control box system. These sensors and control box are configured such that when the sensors detect smoke and/or fire, it sends a signal through the control box to the motor to activate. The motor then rotates the spindle which wraps up the cables, which pull out the fire blanket from the enclosure. When the fire blanket reaches the spindle that is being driven by the motor the two tongs are automatically opened such that they drop that end of the fire blanket. The other end of the fire blanket falls at the same time as its length is such that it is no longer wrapped around the spindle when the tongs are opened.

In another embodiment, the apparatus also contains a hatch used as a general protective cover.

In at least one embodiment, an apparatus is provided including a first device configured to automatically drop a fire blanket onto a vehicle. The first device may be configured to be situated above a parking space. The first device may be configured to automatically drop the fire blanket in response to a signal from a smoke sensor. The first device may be configured to automatically drop the fire blanket in response to a signal from a fire sensor.

In at least one embodiment, the first device includes: an enclosure; a spindle; and a fire blanket; wherein the fire blanket is configured to be stored in the enclosure by being wrapped around the spindle; and wherein the first device is configured to automatically drop the fire blanket by using first and second wires located on opposite corners of a first side of the fire blanket. The first and second wires may be connected to a grabber that is connected to the fire blanket such that when the fire blanket is completely unfurled, the grabber passes through a constraining hole which opens an end of the grabber holding the fire blanket which then releases the fire blanket.

In at least one embodiment a method is provided of using a first device, structured in on or more embodiments as previously described, to automatically drop a fire blanket onto a vehicle. The first device may be configured to automatically drop the fire blanket in response to a signal from a smoke sensor. The first device may be configured to automatically drop the fire blanket in response to a signal from a fire sensor. The first device may be configured to automatically drop the fire blanket by using first and second wires located on opposite corners of a first side of the fire blanket. The first and second wires may be connected to a grabber that is connected to the fire blanket such that when the fire blanket is completely unfurled, the grabber passes through a constraining hole which opens an end of the grabber holding the fire blanket which then releases the fire blanket.

DETAILED DESCRIPTION OF THE INVENTION

Figure 1:
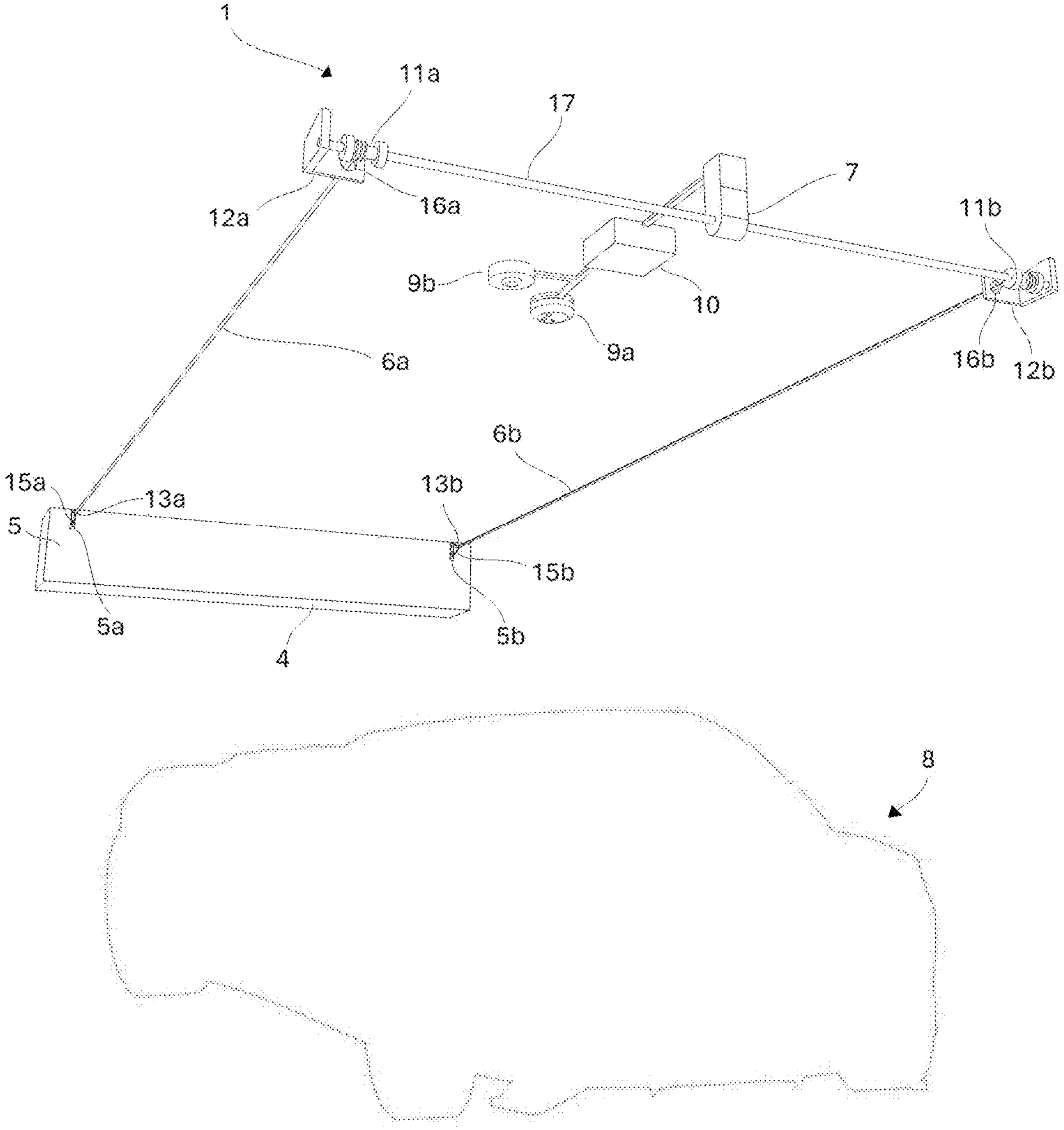
FIG. 1 shows a simplified diagram of a vehicle, and an overhead perspective isometric view of an apparatus for use in accordance with one or more embodiments of the present invention before a fire occurs and a hatch is closed.

FIG. 1 shows a simplified view of a vehicle 8, and a perspective isometric view of an apparatus 1 for use in accordance with one or more embodiments of the present invention when a hatch 5 is closed. The apparatus 1 includes an enclosure 4, two cables 6*a* and 6*b*, a motor 7, a smoke sensor 9*a*, a fire sensor 9*b*, a control box 10, two reels 11*a* and 11*b*, two spindle mounts 12*a* and 12*b*, two reverse action tongs 13*a* and 13*b*, and a spindle 17.

The spindle mounts 12*a* and 12*b* contain constraining holes 16*a* and 16*b*.

The apparatus 1 is configured to be above a vehicle 8.

Figure 2:
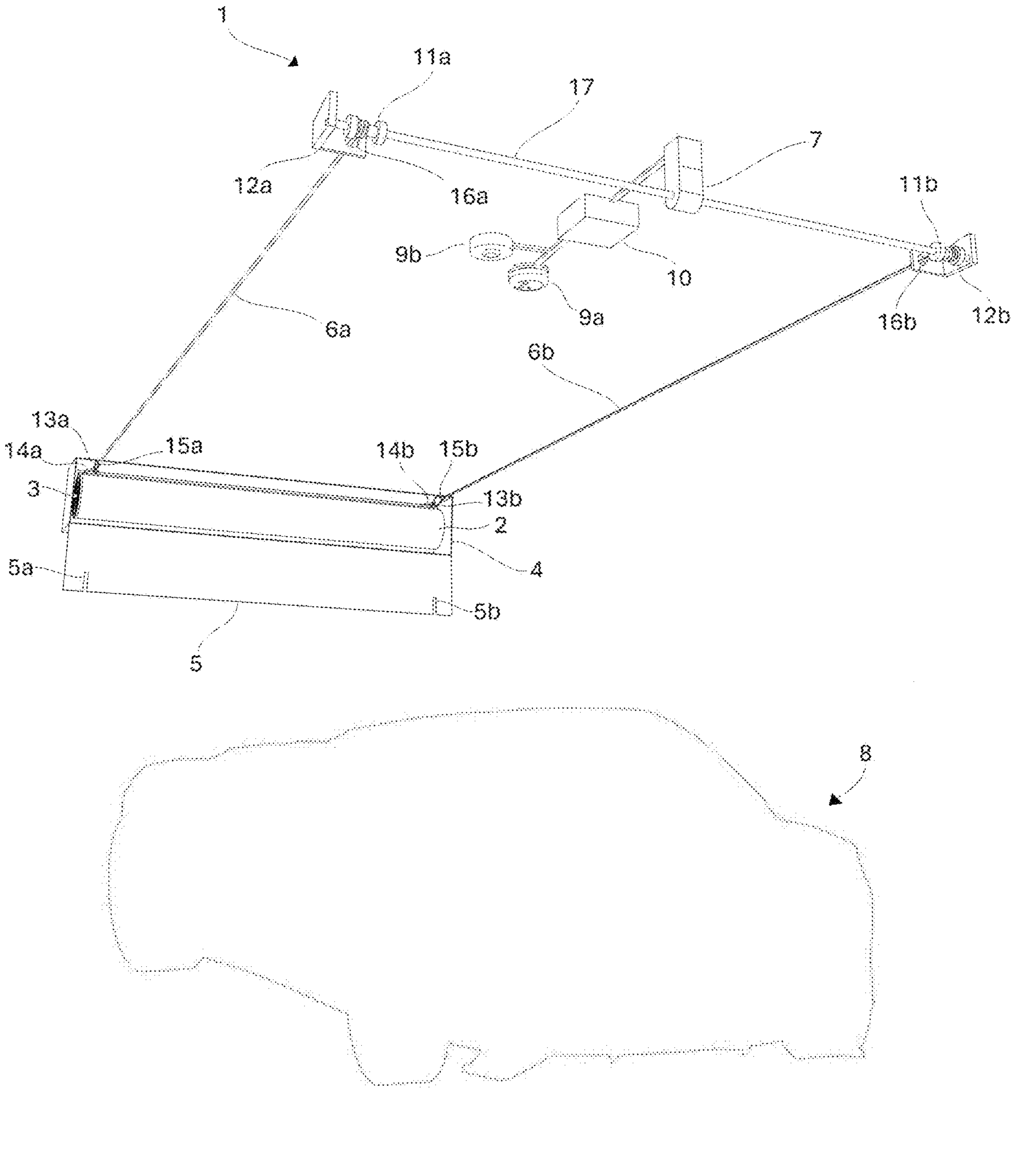
FIG. 2 shows the simplified diagram of the vehicle, and an overhead perspective isometric view of the apparatus in FIG. 1 when the hatch is open exposing a rolled-up fire blanket.

FIG. 2 shows the simplified view of the vehicle 8 and a perspective isometric view of the apparatus 1 in FIG. 1 when the hatch 5 is in an open position. In FIG. 2 a fire blanket 2, spindle 3, D rings 14*a* and 14*b*, and wire eyes 15*a* and 15*b* are shown.

Figure 3:
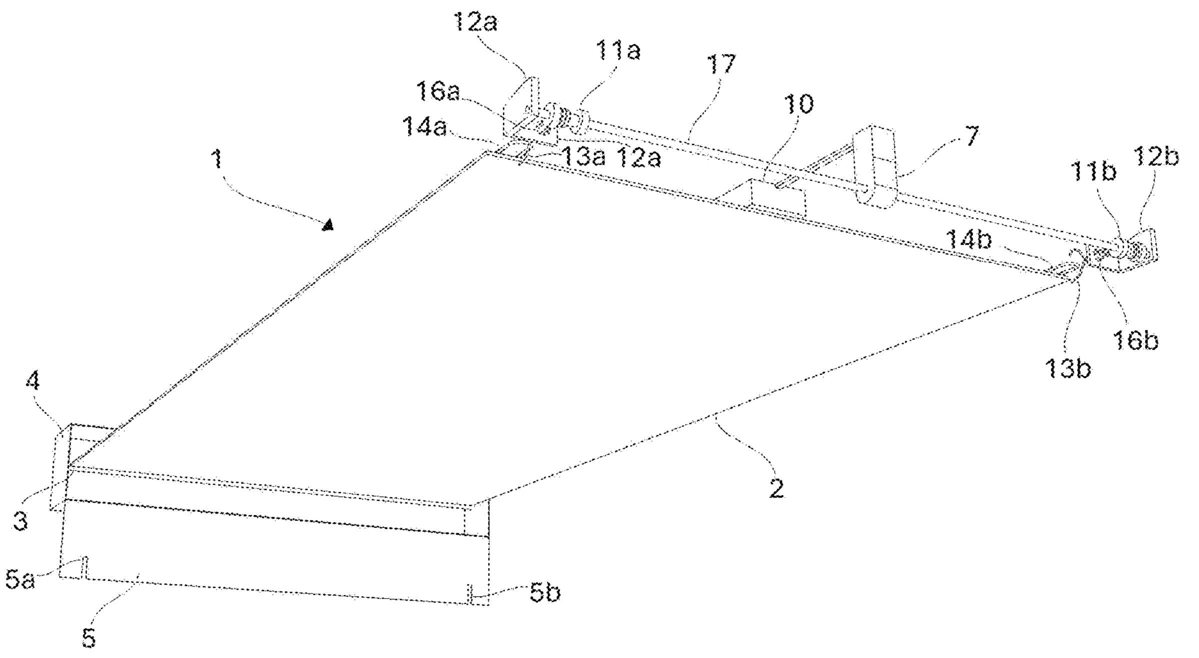
FIG. 3 shows the simplified diagram of the vehicle, and an overhead perspective isometric view of the apparatus in FIG. 1 when the fire blanket has been pulled all the way out and ready to be dropped onto the vehicle.
Figure 3:
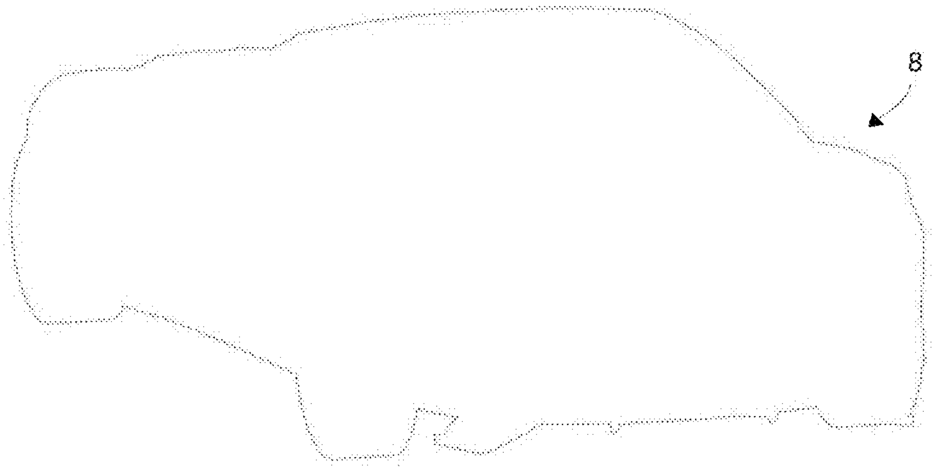

FIG. 3 shows the simplified view of the vehicle 8, and a perspective isometric view of the apparatus 1 in FIG. 2 when the fire blanket 2 has been pulled out, and the reverse action tongs 13*a* and 13*b* have been pulled through the constraining holes 16*a* and 16*b* so that the reverse action tongs 13*a* and 13*b* are in an open position.

Figure 4:
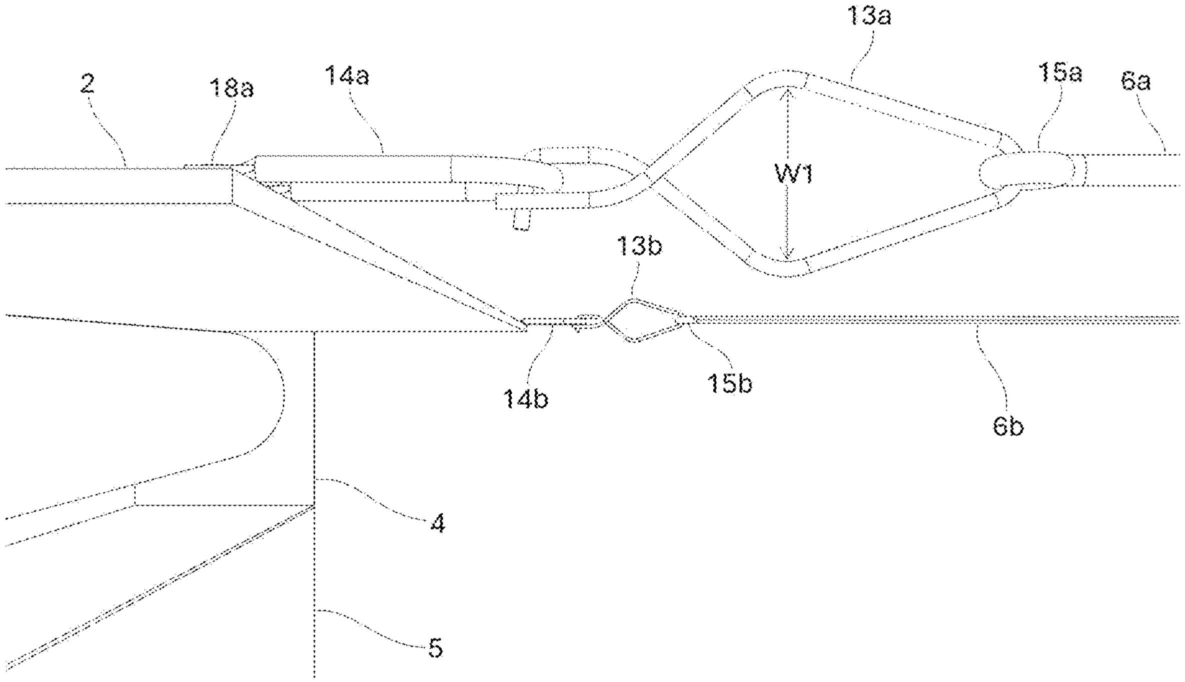
FIG. 4 shows a perspective close up view of two reverse action tongs holding onto two D-rings.

FIG. 4 shows a close-up perspective view of the reverse action tongs 13*a* and 13*b* when the fire blanket 2 has been pulled out slightly so that the reverse action tongs 13*a* and 13*b* are still in a closed position.

Figure 5:
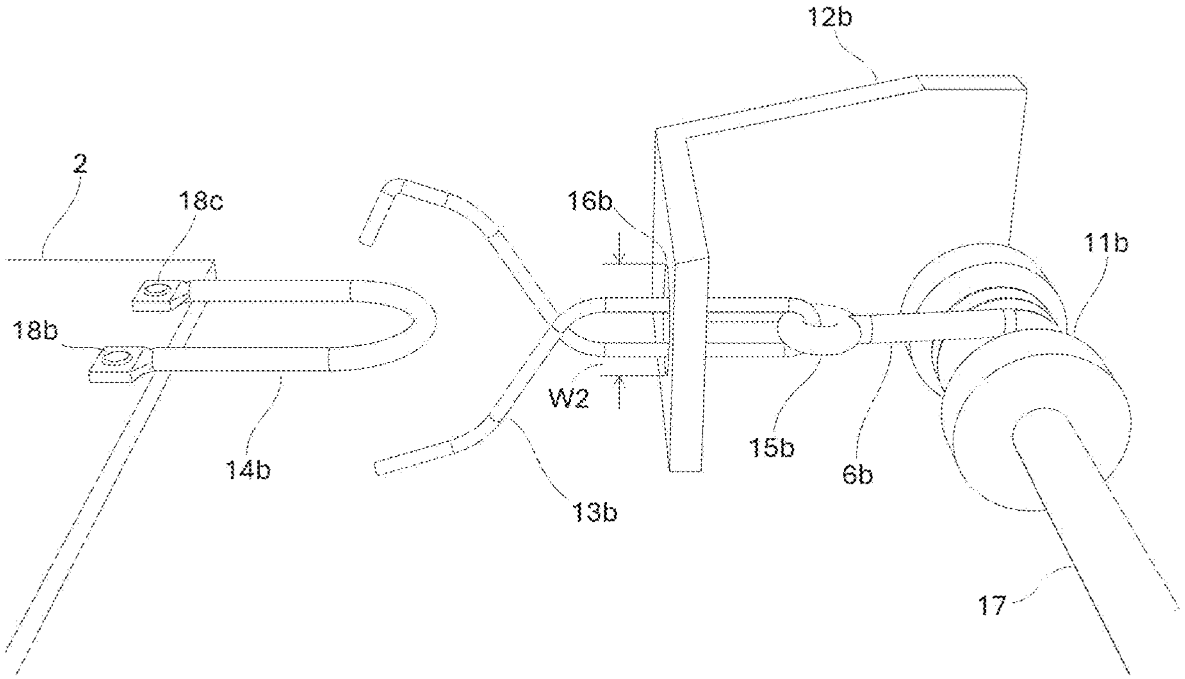
FIG. 5 shows a perspective close up view of one of the reverse action tongs after that reverse action tong has gone through a containment hole so that it can open and release the D-ring.

FIG. 5 shows a close-up perspective view of the spindle mount 12*b* when the fire blanket 2 has been pulled all the way out, and the reverse action tong 13*b* has been pulled through the constraining hole 16*b* so that the reverse action tong 13*b* is in an open position.

In at least one embodiment, the spindle 3, shown in FIGS. 2 and 3, is connected on either end of itself inside the enclosure 4 in a way that allows the spindle 3 to rotate with respect to the enclosure 4. The fire blanket 2 is wrapped around the spindle 3 in a way that when the fire blanket 2 is pulled on, the spindle 3 around which the fire blanket 2 is wrapped rotates its axis, such that the fire blanket 3 is pulled out of the enclosure 4.

One end of the fire blanket 2 is wrapped around the spindle 3 in such a way that the opposite end of the fire blanket 2 points out of the enclosure 4. Near the end and at either corner of the fire blanket 2 that is pointing out of the enclosure 4 are two D rings 14*a* and 14*b* that are fastened to the fire blanket 2 by permanent fasteners 18*a*, 18*b*, and 18*c*.

Reverse action tongs 13*a* and 13*b* are locked onto D rings 14*a* and 14*b*, respectively, (as shown in FIG. 4 for D ring 14*b*) in such a way that the ends of the reverse action tongs 13*a* and 13*b* which can open are looped around the particular D ring or D rings 14 and 14*b*, so that when the opposite ends of the reverse action tongs 13*a* and 13*b* are pulled the reverse action tongs 13*a* and 13*b*, when closed, pull on the D rings 14*a* and 14*b*, which in turn pull on the fire blanket 2, which then unfurls as the spindle 3 rotates inside the enclosure 4. The opposite ends of the reverse action tongs 13*a* and 13*b* pass through wire eyes 15*a* and 15*b*, which is connected to cables 6*a* and 6*b*, respectively, in such a way that when the cables 6*a* and 6*b* are pulled, the cables 6*a* and 6*b* pulls on the wire eyes 15*a* and 15*b*, which then pulls on the reverse action tongs 13*a* and 13*b*, respectively.

The cables 6*a* and 6*b* travel away from the fire blanket 2 and pass through constraining holes 16*a* and 16*b*, respectively, shown in FIG. 3 . . . . The cables 6*a* and 6*b*, after passing through the constraining holes 16*a* and 16*b*, attach to reels 11*a* and 11*b*. The reels 11*a* and 11*b* are attached to a spindle 17 which is attached to a motor 7. When the motor 7 operates it rotates the spindle 17 which rotates the reels 11*a* and 11*b*, which wraps up and pulls on the cables 6*a* and 6*b* through the constraining holes 16*a* and 16*b*, respectively.

The reverse action tongs 13*a* and 13*b* is configured such that the ends being pulled by the wire eyes 15*a* and 15*b* is smaller than the diameter of the constraining holes 16*a* and 16*b*, respectively. The wide part of each of the reverse action tongs 13*a* and 13*b*, shown by W1 is separated a larger distance than width W2 of each of the constraining holes 16*a* and 16*b*. The effect of this is that when the first end of the reverse action tongs 13*a* and 13*b* pass through the constraining holes 16*a* and 16*b*, the wider part of the reverse action tongs 13*a* and 13*b* become effectively squeezed together. The end of the reverse action tongs 13*a* and 13*b* locked around the D rings 14*a* and 14*b*, then open up allowing the D rings 14*a* and 14*b* and that end of the fire blanket 2 to fall.

The enclosure 4 has a hatch 5 that is closed when the fire blanket 2 is completely rolled up around the spindle 3. The hatch 5 has slots 5*a* and 5*b* such that the cables 6*a* and 6*b* are allowed to pass through the hatch 5 when it is closed. The hatch 5 is connected to the enclosure 4 at the bottom of the hatch 5 so that when the fire blanket 2 is pulled out by the cables 6*a* and 6*b* it naturally opens and swings down.

The apparatus 1 contains a smoke sensor 9*a*, and/or fire alarm 9*b*, and control box 10, shown in FIG. 1. When the control box 10 receives a signal from either the smoke sensor 9*a* or fire sensor 9*b* the control box 10 then activates the motor 7.

The fire blanket 2 is unfurled from the spindle 3 by the cables 6*a* and 6*b*. The fire blanket 2 has a length such that when the end of the fire blanket 2 that has the D rings 14*a* and 14*b* on it reaches the constraining holes 16*a* and 16*b*, the end of the fire blanket 2 wrapped around the spindle 3 is no longer wrapped around the spindle 3 such that it then falls. In this way, both ends of the fire blanket 2 fall at the same time.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

We claim:

1. An apparatus comprising a first device configured to automatically drop a fire blanket onto a vehicle;

wherein the first device includes:

an enclosure;

a spindle;

the fire blanket;

and a first wire;

wherein the fire blanket is configured to be stored in the enclosure by being wrapped around the spindle; and wherein the first device is configured to automatically drop the fire blanket by using at least the first wire located on a first side of the fire blanket; and wherein the first device further includes:
a first reverse tongs;
wherein the first reverse tongs has a first arm and a second arm;
wherein each of the first arm and the second arm of the first reverse tongs has a first end and a second end;
wherein the first reverse tongs are configured to have the first ends of its first and second arms come together in a closed state, with respect to each other, when the first ends of the first and second arms of the first reverse tongs are connected to the first side of the fire blanket;
wherein the first wire is connected to the second ends of the first and second arms of the first reverse tongs in order to connect the first wire with the first side of the fire blanket; and
wherein the first reverse tongs are configured to be changed from a closed state to an open state, in which the first reverse tongs release the fire blanket, by the first ends of the first and second arms of the first reverse tongs separating from each other, so that the first reverse tongs and the first wire are no longer connected to the first side of the fire blanket.

2. The apparatus of claim 1 wherein
the first device is configured to be situated above a parking space.

3. The apparatus of claim 1 wherein
the first device is configured to automatically drop the fire blanket in response to a signal from a smoke sensor.

4. The apparatus of claim 1 wherein
the first device is configured to automatically drop the fire blanket in response to a signal from a fire sensor.

5. The apparatus of claim 1 wherein the first device further includes:
a second wire; and
a second reverse tongs;
wherein the first device is configured to automatically drop the fire blanket by using at least the first wire and the second wire located on the first side of the fire blanket; and
wherein the second reverse tongs has a first arm and a second arm;
wherein each of the first arm and the second arm of the second reverse tongs has a first end and a second end;
wherein the second reverse tongs are configured to have the first ends of its first and second arms come together in a closed state, with respect to each other, when the first ends of the first and second arms of the second reverse tongs are connected to the first side of the fire blanket;
wherein the second wire is connected to the second ends of the first and second arms of the second reverse tongs in order to connect the second wire with the first side of the fire blanket, at a corner which is opposite a corner to which the first wire is connected with the first side of the fire blanket; and
wherein the second reverse tongs are configured to be changed from a closed state to an open state, in which the second reverse tongs release the fire blanket, by the first ends of the first and second arms of the second reverse tongs separating from each other, so that the second reverse tongs and the second wire are no longer connected to the first side of the fire blanket.

6. The apparatus of claim 1
wherein the first reverse tongs are configured to change from the closed state to the open state, with respect to each other, when the second ends of the first and second arms of the first reverse tongs, and at least part of the first reverse tongs, pass through a first constraining hole to cause the first ends of the first and second arms of the first reverse tongs to separate from each other.

7. A method comprising
using a first device to automatically drop a fire blanket onto a vehicle;
wherein the first device includes:
an enclosure:
a spindle;
the fire blanket;
and a first wire;
wherein the fire blanket is configured to be stored in the enclosure by being wrapped around the spindle; and
wherein the first device is configured to automatically drop the fire blanket by using at least the first wire located on a first side of the fire blanket; and
wherein the first device further comprises:
a first reverse tongs;
wherein the first reverse tongs has a first arm and a second arm;
wherein each of the first arm and the second arm of the first reverse tongs has a first end and a second end;
wherein the first reverse tongs are configured to have the first ends of its first and second arms come together in a closed state, with respect to each other, when the first ends of the first and second arms of the first reverse tongs are connected to the first side of the fire blanket;
wherein the first wire is connected to the second ends of the first and second arms of the first reverse tongs in order to connect the first wire with the first side of the fire blanket; and
wherein the first reverse tongs are configured to be changed from a closed state to an open state, in which the first reverse tongs release the fire blanket, by the first ends of the first and second arms of the first reverse tongs separating from each other, so that the first reverse tongs and the first wire are no longer connected to the first side of the fire blanket.

8. The method of claim 7 wherein
the first device is configured to automatically drop the fire blanket in response to a signal from a smoke sensor.

9. The method of claim 6 wherein
the first device is configured to automatically drop the fire blanket in response to a signal from a fire sensor.

10. The method of claim 7 wherein the first device further includes:
a second wire; and
a second reverse tongs;
wherein the first device is configured to automatically drop the fire blanket by using at least the first wire and the second wire located on the first side of the fire blanket; and
wherein the second reverse tongs has a first arm and a second arm;
wherein each of the first arm and the second arm of the second reverse tongs has a first end and a second end;
wherein the second reverse tongs are configured to have the first ends of its first and second arms come together in a closed state, with respect to each other, when the first ends of the first and second arms of the second reverse tongs are connected to the first side of the fire blanket;
wherein the second wire is connected to the second ends of the first and second arms of the second reverse tongs in order to connect the second wire with the first side of the fire blanket, at a corner which is opposite a corner to which the first wire is connected with the first side of the fire blanket; and wherein the second reverse tongs are configured to be changed from a closed state to an open state, in which the second reverse tongs release the fire blanket, by the first ends of the first and second arms of the second reverse tongs separating from each other, so that the second reverse tongs and the second wire are no longer connected to the first side of the fire blanket.

11. The method of claim 1 wherein wherein the first reverse tongs are configured to change from the closed state to the open state, when the second ends of the first and second arms of the first reverse tongs, and at least part of the first reverse tongs, pass through a first constraining hole to cause the first ends of the first and second arms of the first reverse tongs to separate from each other.

12. The apparatus of claim 5 wherein the first reverse tongs are configured to change from the closed state to the open state, when the second ends of the first and second arms of the first reverse tongs, and at least part of the first reverse tongs, pass through a first constraining hole to cause the first ends of the first and second arms of the first reverse tongs to separate from each other; and wherein the second reverse tongs are configured to change from the closed state to the open state, when the second ends of the first and second arms of the second reverse tongs, and at least part of the second reverse tongs, pass through a second constraining hole to cause the first ends of the first and second arms of the second reverse tongs to separate from each other.

13. The method of claim 10 wherein the first reverse tongs are configured to change from the closed state to the open state, when the second ends of the first and second arms of the first reverse tongs, and at least part of the first reverse tongs, pass through a first constraining hole to cause the first ends of the first and second arms of the first reverse tongs to separate from each other, and wherein the second reverse tongs are configured to change from the closed state to the open state, when the second ends of the first and second arms of the second reverse tongs, and at least part of the second reverse tongs, pass through a second constraining hole to cause the first ends of the first and second arms of the second reverse tongs to separate from each other.

* * * * *